(12) United States Patent
Zheng et al.

(10) Patent No.: US 11,403,871 B2
(45) Date of Patent: Aug. 2, 2022

(54) METHOD FOR FINGERPRINT IDENTIFICATION, TERMINAL DEVICE AND STORAGE MEDIUM

(71) Applicant: BEIJING XIAOMI MOBILE SOFTWARE CO., LTD., Beijing (CN)

(72) Inventors: Jinzeng Zheng, Beijing (CN); Weilin Sang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/238,118

(22) Filed: Apr. 22, 2021

(65) Prior Publication Data

US 2022/0044002 A1 Feb. 10, 2022

(30) Foreign Application Priority Data

Aug. 6, 2020 (CN) .......................... 202010785675.7

(51) Int. Cl.

| | |
|---|---|
| *G06V 40/13* | (2022.01) |
| *G06V 40/12* | (2022.01) |
| *H04M 1/72463* | (2021.01) |
| *H04M 1/72454* | (2021.01) |
| *G06V 40/40* | (2022.01) |
| *G01S 7/41* | (2006.01) |
| *G01S 13/04* | (2006.01) |

(Continued)

(52) U.S. Cl.
CPC .......... *G06V 40/1365* (2022.01); *G01S 7/412* (2013.01); *G01S 13/04* (2013.01); *G06F 21/32* (2013.01); *G06N 3/08* (2013.01); *G06V 40/1306* (2022.01); *G06V 40/1394* (2022.01); *G06V 40/45* (2022.01); *H04M 1/72454* (2021.01); *H04M 1/72463* (2021.01)

(58) Field of Classification Search
CPC ........... G06V 40/1365; G06V 40/1394; G06V 40/1306; G06V 40/45; H04M 1/72463; H04M 1/72454; G01S 7/412; G01S 13/04; G06F 21/32; G06N 3/08
See application file for complete search history.

(56) References Cited

U.S. PATENT DOCUMENTS

2005/0265586 A1* 12/2005 Rowe ................ G06V 40/1394
                                                       382/124
2008/0316181 A1* 12/2008 Nurmi ................... G06F 1/1626
                                                       345/173

(Continued)

OTHER PUBLICATIONS

Supplementary European Search Report in the European Application No. 21171194.0, dated Oct. 21, 2021, (8p).

*Primary Examiner* — Stephen G Sherman
(74) *Attorney, Agent, or Firm* — Arch & Lake LLP (57) ABSTRACT

A method for fingerprint identification. In the method, a radar wave is transmitted and a returned radar wave is received by using a radar sensor of the terminal device, when performing a fingerprint unlocking of the terminal device; a radar wave characteristic is acquired according to the transmitted radar wave and the received returned radar wave; in response to determining from the radar wave characteristic that the living finger is detected in the radar emission region of the radar sensor, the fingerprint sensor of the terminal device is awakened; and the fingerprint is acquired based on the awakened fingerprint sensor, and the acquired fingerprint is identified for unlocking of the terminal device.

16 Claims, 7 Drawing Sheets

(51) Int. Cl.
  *G06F 21/32* (2013.01)
  *G06N 3/08* (2006.01)

(56) References Cited

U.S. PATENT DOCUMENTS

| | | | |
|---|---|---|---|
| 2010/0189314 A1* | 7/2010 | Benkley | G06V 40/1394 |
| | | | 382/124 |
| 2015/0074615 A1* | 3/2015 | Han | H04W 12/06 |
| | | | 715/863 |
| 2018/0322351 A1 | 11/2018 | Shaker | |
| 2019/0050623 A1* | 2/2019 | Lavin | G06V 40/1394 |
| 2019/0187265 A1 | 6/2019 | Barbello et al. | |
| 2020/0234030 A1 | 7/2020 | Baheti et al. | |
| 2020/0300998 A1 | 9/2020 | Barbello et al. | |
| 2021/0004620 A1 | 1/2021 | Shaker | |
| 2021/0150174 A1* | 5/2021 | Fu | H01L 27/3225 |

* cited by examiner

METHOD FOR FINGERPRINT IDENTIFICATION, TERMINAL DEVICE AND STORAGE MEDIUM

CROSS-REFERENCE TO RELATED APPLICATIONS

This application claims priority to Chinese Application No. 202010785675.7, filed on Aug. 6, 2020, the contents of which are incorporated herein by reference in their entirety for all purposes.

TECHNICAL FIELD

The present disclosure relates to the field of information identification technology, and more particularly, to a method for fingerprint identification, a terminal device and a storage medium.

BACKGROUND

With the development of terminal devices and user demands, the fingerprint sensor has become a common module for existing terminal devices. It is increasingly popular to initiate unlocking of a terminal device by identifying fingerprint on display (FOD). Existing screen fingerprint identification typically determines whether to unlock the terminal by analyzing a two-dimensional image.

SUMMARY

The present disclosure provides a method for fingerprint identification, a terminal device, and a storage medium.

According to a first aspect of examples of the present disclosure, there is provided a method for fingerprint identification, the method including:

transmitting a radar wave and receiving a returned radar wave by using a radar sensor of the terminal device;

acquiring a radar wave characteristic according to the transmitted radar wave and the returned radar wave that is received; and in response to determining from the radar wave characteristic that a living finger is detected in a radar emission region of the radar sensor, acquiring a fingerprint based on the fingerprint sensor of the terminal device, and identifying the acquired fingerprint for unlocking of the terminal device.

According to a second aspect of examples of the present disclosure, there is provided a terminal device, the terminal device including:

a screen;

a fingerprint sensor, disposed below the screen and facing the screen;

a radar sensor, disposed below the screen and at a different position from that of the fingerprint sensor, and configured to transmit a radar wave to the screen and receive a returned radar wave; and a processor, connected to the radar sensor and the fingerprint sensor, in which the processor is configured to: acquire a radar wave characteristic, according to the transmitted radar wave and the returned radar wave that is received; and in response to determining from the radar wave characteristic that a living finger is detected in a radar emission region of the radar sensor, acquire a fingerprint based on the fingerprint sensor of the terminal device, and identify the acquired fingerprint for unlocking of the terminal device.

According to a third aspect of examples of the present disclosure, there is provided a non-temporary computer-readable storage medium having stored therein computer-executable instructions which, when executed by a processor, cause the processor to transmit a radar wave and receive a returned radar wave by using a radar sensor of the terminal device; acquire a radar wave characteristic, according to the transmitted radar wave and the received returned radar wave; and in response to determining from the radar wave characteristic that a living finger is detected in a radar emission region of the radar sensor, acquire a fingerprint based on the fingerprint sensor of the terminal device, and identify the acquired fingerprint for unlocking of the terminal device.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the disclosure and, together with the description, serve to explain the principles of the disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the present disclosure.

With the development of terminal devices and user demands, the fingerprint sensor has become a common module for existing terminal devices. It is increasingly popular to initiate unlocking of a terminal device by identifying fingerprint on display (FOD). Existing screen fingerprint identification typically determines whether to unlock the terminal by analyzing a two-dimensional image. However, the unlocking solution based on the two-dimensional image has a problem of poor accuracy in the image identification for unlocking.

Figure 1:
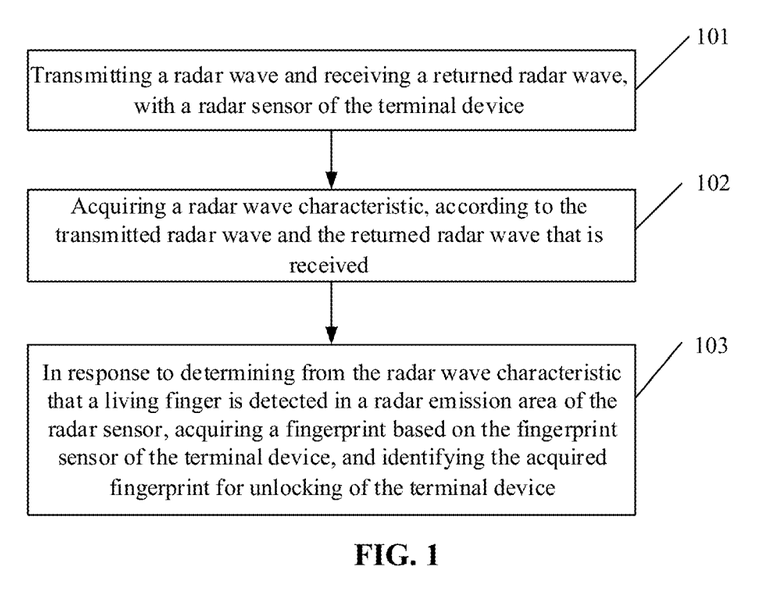
FIG. 1 is a flowchart showing a method for fingerprint identification, according to an example.

FIG. 1 is a flowchart showing a method for fingerprint identification, according to an example of the present disclosure. As shown in FIG. 1, the method is applied to a terminal device and includes following steps S101-S103.

In step S101, a radar wave is transmitted and a returned radar wave is received, with a radar sensor of the terminal device.

In step S102, a radar wave characteristic is acquired, according to the transmitted radar wave and the returned radar wave that is received.

In step S103, in response to determining from the radar wave characteristic that a living finger is detected in a radar emission region of the radar sensor, a fingerprint is acquired based on the fingerprint sensor of the terminal device, and the acquired fingerprint is identified for unlocking of the terminal device.

The aforementioned terminal device may be a terminal device provided with a fingerprint sensor and a radar sensor. The step of the terminal device transmitting radar wave and receiving the returned radar wave with the radar sensor, may include that the terminal device transmits the radar wave with the radar sensor to an object being detected in a fingerprint identification region, and receives the retuned radar wave from the object being detected.

It is to be noted that the fingerprint identification region is an area in which the object being detected can be identified by the fingerprint sensor. The position of the fingerprint identification region may be set according to an orientation of an acquisition surface of the fingerprint sensor. For example, when the acquisition surface of the fingerprint sensor faces a screen, the fingerprint identification region may be disposed on the screen; when the acquisition surface of the fingerprint sensor faces a back shell, the fingerprint identification region may be disposed on the back shell. The object being detected may include a finger, the finger may be a thumb, a middle finger, or a ring finger, which is not limited in the example of the present disclosure.

In the example of the present disclosure, after receiving the returned radar wave, the terminal device may acquire a radar wave characteristic according to the transmitted radar wave and the returned radar wave that is received.

The radar wave characteristic may include, but is not limited to, a radar wave coverage area characteristic, a distance characteristic, a velocity characteristic, and an angular characteristic.

The distance characteristic may be determined according to transmission time of the radar wave, reception time of the returned radar wave, and propagation speed of the radar wave. The velocity characteristic may be determined according to a difference between a transmission frequency of the radar wave and a reception frequency of the returned radar wave. The angular characteristic may be determined according to a phase change of the returned radar wave. The radar wave coverage area characteristic may be determined according to the set position of the radar wave, a transmitting range of the radar wave and a receiving range of the radar wave.

In the example of the present disclosure, an attitude change of the object being detected within a preset time period may be determined according to the distance characteristic, the velocity characteristic, and the angular characteristic. Based on the angular characteristic and the radar wave coverage area characteristic, a shape characteristic and a shape change characteristic of the radar wave may be determined. As such, the characteristic estimated based on the radar wave characteristic may be used to represent whether the object being detected is in a stationary state or whether the shape of the object being detected conforms to a shape of a finger; thus, it can be determined whether the object being detected is a living finger according to the radar wave characteristic.

It is to be noted that the attitude change characteristic of the object being detected may include a relative movement distance of the object being detected, a relative movement speed of the object being detected, and a movement direction of the object being detected, which is not limited in the present disclosure.

In some examples, the step of acquiring the radar wave characteristic according to the transmitted radar wave and the returned radar wave that is received, may include: performing time-frequency processing on the radar wave and the returned radar wave to acquire the radar wave characteristic. Here, the radar wave characteristic may include at least one of the following: a shape characteristic of an object being detected in the radar emission region determined based on the returned radar wave, or an attitude change characteristic within a preset time period.

The fingerprint identification region may be in the radar emission region, and a size of the radar emission region may be larger than that of the fingerprint identification region. As such, the radar sensor can better transmit the radar wave to the object being detected disposed in the fingerprint identification region.

The time-frequency processing may include time-domain processing and frequency-domain processing. After the time-frequency processing, a range Doppler spectrum, a range spectrum, a Doppler spectrum and an angular spectrum can be obtained. The radar wave characteristic of the object being detected in the preset time period may be determined by the range Doppler spectrum, the range spectrum, the Doppler spectrum, and the angular spectrum.

The preset time period may include a time corresponding to a fixed frame length, and the fixed frame length may be set according to actual conditions. For example, the fixed frame length may be set to 8 frames or 10 frames, which is not limited in the example of the present disclosure.

In the example of the present disclosure, it can be determined whether the object being detected is a living finger according to the shape characteristic or the attitude change characteristic of the object being detected. In some examples, whether the object being detected is of a finger shape may be determined according to the shape characteristic; and whether the object being detected is a living body may be determined according to the attitude change characteristic.

Therefore, it can be determined whether the object being detected is a living body of a finger based on the shape characteristic or the attitude change characteristic; and the object being detected can further be identified before the fingerprint acquisition. Therefore, unlocking caused by unintended touch of a non-finger prosthesis can be reduced effectively, and accuracy of the fingerprint unlocking of the terminal device can be improved.

Here, the step of determining whether the object being detected is of the finger shape according to the shape characteristic, may include: determining a shape of the object being detected according to the shape characteristic; in response to the shape of the object being detected matching a preset shape, determining that the shape of the object being detected is a finger shape. The finger shape may include at least one of the following: a thumb shape, a middle finger shape, or a ring finger shape, which is not limited in the example of the present disclosure.

An attitude change of the object being detected can be determined according to the attitude change characteristic of the object being detected, and whether the object being detected is a living body can be further determined based on the detected attitude change. Here, the attitude change of the object being detected may include, but is not limited to, a displacement change of the object being detected, a velocity change of the object being detected, or an angular change of the object being detected. For example, when it is detected that the displacement change and the velocity change within a preset time period are within a preset threshold range, it indicates that the movement of the object being detected is coherent; and then it can be determined that the object being detected is a living body rather than a prosthesis.

In the example of the present disclosure, it can be determined whether the object being detected is a living body or a prosthesis directly by detecting whether the object has an attitude change. For example, the one with the attitude change may be a living body, while the one without the attitude change may be a prosthesis.

Further, the terminal device may further determine that the object being detected is a living body when the attitude change of the object being detected meets a preset condition.

It is to be noted that the preset condition may include a preset movable angular range. The living finger has a movable angular range; and when the movable angle of the object being detected is not within the movable angular range, it can be determined that the object being detected is a prosthesis.

For example, the movable angle of the living finger may range from 0 to 180 degrees. When the movable angle of the object being detected is 270 degrees, it may be determined that the object being detected is a prosthesis. When the movable angle of the object being detected is 90 degrees, it may be determined that the object being detected is a living body.

In the example of the present disclosure, the living finger has a movable joint, and the angle between two portions connecting the movable joint can be relatively changed. For example, when the living finger is rotated 90 degrees, the angle between the two portions of the movable joint can be changed from 180 degrees to 90 degrees, while the prosthetic finger, such as a plastic finger, does not have a relative angular change when rotated 90 degrees. Thus, the preset condition may also include whether there is a relative angular change. When there is a relative angular change for the two portions of the object being detected, it may be determined that the object being detected is a living body. When there is not a relative angular change for the two portions of the object being detected, it may be determined that the object being detected is a prosthesis.

Therefore, based on the movable angle of the object being detected and the relative angle change of the object being detected, the prosthesis can further be ruled out effectively, and the accuracy of living body detection can be improved.

In the example of the present disclosure, the radar wave characteristic may include, in addition to the shape characteristic and the attitude change characteristic of the object being detected, a contact area characteristic of the object being detected, which is not limited in the example of the present disclosure.

In some examples, the terminal device may further determine whether the object being detected is a finger according to the contact area characteristic, or determine whether the object being detected is a finger according to the shape characteristic and the contact area characteristic, which is not limited in the examples of the present disclosure.

Figure 2:
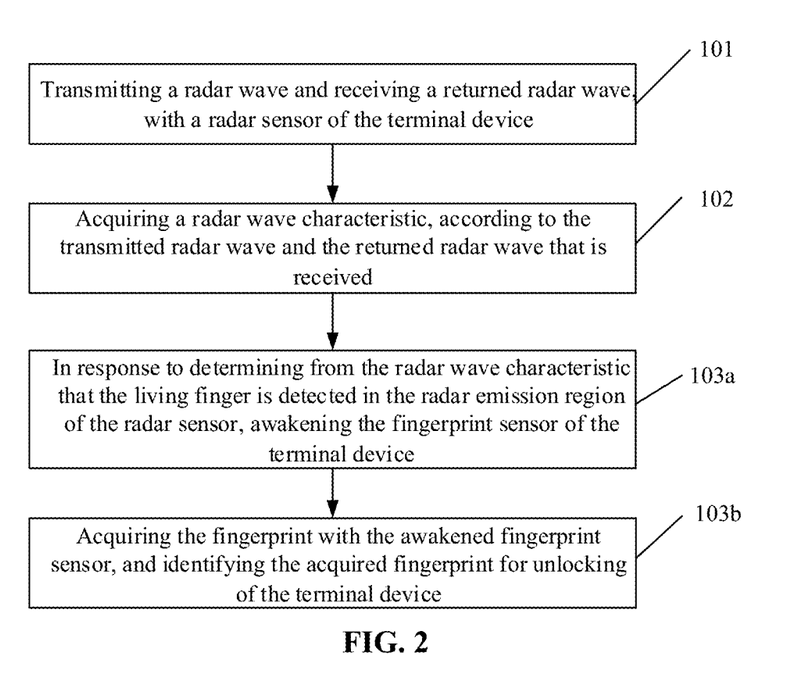
FIG. 2 is a flowchart showing another method for fingerprint identification, according to an example.

In some examples, as shown in FIG. 2, when it is determined from the radar wave characteristics that the living finger is detected in the radar emission region of the radar sensor, the fingerprint may be acquired with the fingerprint sensor of the terminal device, and the acquired fingerprint may be identified for unlocking of the terminal device. That is, the step S103 may include the following steps.

In step S103a, in response to determining from the radar wave characteristic that the living finger is detected in the radar emission region of the radar sensor, the fingerprint sensor of the terminal device is awakened;

In step S103b, the fingerprint is acquired with the awakened fingerprint sensor, and the acquired fingerprint is identified for unlocking of the terminal device.

In the example of the present disclosure, in order to reduce power consumption generated by the fingerprint sensor, the fingerprint sensor may be in a sleep state during the unlocking process of the terminal device. When a living finger is detected, firstly the fingerprint sensor of the terminal device is awakened. Thus, the system power consumption increasement due to awakening of the fingerprint acquisition module by unintended touch is reduced. Therefore, the power consumption of the terminal device with the fingerprint unlocking function can be effectively saved, and the use time of the terminal device can be prolonged.

In some examples, the terminal device may further include controlling the fingerprint sensor to be in a sleep state, when no living finger is detected.

It is to be noted that when no living finger is detected, it may indicate that the terminal device is touched unintendedly. For example, there may be an unintended touch caused by the terminal device being placed in a pocket, or an unintended touch caused by non-finger touching in the fingerprint identification region of a screen of a handheld terminal device. In this case, the fingerprint sensor does not need to perform fingerprint identification, and the terminal device does not need to awaken the fingerprint sensor in the sleep state.

As such, according to the example of the present disclosure, by controlling the fingerprint sensor to be in the sleep state when no living finger is detected, the power consumption increasement due to awakening of the terminal device by unintended touch of the terminal device is reduced. Therefore, the power consumption of the terminal device can be effectively saved, and the use time of the terminal device can be prolonged.

In the example of the present disclosure, the step of controlling the fingerprint sensor to be in the sleep state when no living finger is detected, may include:

when no living finger is detected, not awakening the fingerprint sensor in the sleep state;

when no living finger is detected, controlling the fingerprint sensor to exit the awakened state and enter the sleep state.

That is, according to the example of the present disclosure, an operation state of the fingerprint sensor may be determined in advance. When the operation state of the fingerprint sensor is the sleep state and no living body is detected, the fingerprint sensor may be not awakened, so that the fingerprint sensor may continue to remain in the sleep state. When the operation state of the fingerprint sensor is the awakened state and no living body is detected, the fingerprint sensor may be controlled to switch from the awakened state to the sleep state. As described above, in the example of the present disclosure, the fingerprint sensor can be controlled flexibly to enter the sleep state from a different state when a living finger is detected, thus reducing the power consumption of the terminal device and prolonging the use time of the terminal device.

In the example of the present disclosure, after awakening the fingerprint sensor of the terminal device, the fingerprint may be acquired with the awakened fingerprint sensor, and the acquired fingerprint may be identified for unlocking of the terminal device. The process of the fingerprint sensor acquiring the fingerprint may include: transmitting light to the object being detected and receiving reflected light that is returned, and forming a fingerprint image based on the reflected light, thus realizing identification of the fingerprint for unlocking of the terminal device.

The fingerprint sensor can realize the unlocking of the terminal device by identifying the fingerprint in the identification region in the screen of the terminal device, and the fingerprint sensor can also realize the unlocking of the terminal device by identifying the fingerprint in the identification region on the back shell of the terminal device, which is not limited in the example of the present disclosure.

In the example of the present disclosure, the unlocking process of the terminal device may include: when the acquired fingerprint matches a fingerprint template input to the terminal device, unlocking the terminal device; when the acquired fingerprint does not match the fingerprint template input to the terminal device, the terminal device continuing to be in the locking state. Thus, the fingerprint unlocking process of the terminal device can be realized by comparing the acquired fingerprint with the fingerprint template.

It is to be noted that, according to the example of the present disclosure, the radar wave characteristic may be acquired based on the returned radar wave received with the radar sensor, and it may be determined whether a living finger is detected based on the radar wave characteristic. And then, the fingerprint sensor may be awakened to acquire a fingerprint, in response to determining that the living finger is detected. That is, in the example of the present disclosure, before the fingerprint sensor acquiring the fingerprint; it is firstly determined whether the living finger is detected in a radar emission region, rather than performing fingerprint acquisition on any object being detected. Therefore, by detecting the living finger, unlocking caused by unintended touch of a non-finger prosthesis is reduced effectively, and accuracy of the fingerprint unlocking is improved. In addition, since the fingerprint sensor is awakened when the living finger is detected, the system power consumption increasement due to awakening of the fingerprint acquisition module by unintended touch is reduced. Therefore, the power consumption of the terminal device can be effectively saved with the fingerprint unlocking function, and the use time of the terminal device can be prolonged.

In some examples, the step of determining according to the radar wave characteristic that the living finger is detected in the radar emission region of the radar sensor may include:

inputting the radar wave characteristic into a living finger identification model to acquire a matching degree between an object being detected and the living finger identification model; and in response to the matching degree being greater than a matching threshold, determining that the living finger is detected in the radar emission region of the radar sensor.

In the example of the present disclosure, the terminal device may store a living finger identification model in advance. And after acquiring the radar wave characteristic, the terminal device may perform matching based on the living finger identification model, and further determine whether the living finger is detected.

It is to be noted that the living finger identification model may be constituted by a plurality of sub-models corresponding to different fingers, and the plurality of sub-models are capable of detecting whether a different object being detected is a living finger according to the radar wave characteristic of the object being detected. For example, the fingers may include at least one of: a middle finger and an ring finger; the object being detected may be detected to be a living middle finger based on a sub-model corresponding to the middle finger; and the object being detected may be detected to be a living ring finger based on a sub-model corresponding to the ring finger.

In the example of the present disclosure, there may be a plurality of radar sensors, and a plurality of sets of radar wave characteristics may be acquired with the plurality of radar sensors. And then, the plurality of sets of radar wave characteristics may be input to a living finger identification model, so that a plurality of sets of matching degrees of the plurality of sets of radar wave characteristics may be acquired. According to the example of the present disclosure, after acquiring the plurality of sets of matching degrees, normalization processing may be performed on the plurality of sets of matching degrees of the plurality of sets of radar wave characteristics, and it may be further determined that the object being detected is a living finger when a normalized matching result is greater than a matching threshold.

It is to be noted that the normalization processing means normalizing the plurality of sets of matching degrees of the plurality of sets of radar wave characteristics to a fraction between 0 and 1. The step of performing normalization processing on the plurality of sets of matching degrees of the plurality of sets of radar wave characteristics, may include: acquiring a highest matching degree and a lowest matching degree of the plurality of sets of radar wave characteristics, and determining a normalized matching result of the plurality of sets of radar wave characteristics based on the highest matching degree and the lowest matching degree.

Therefore, through determining whether the object being detected is a living finger according to the matching result acquired by the normalization processing, inaccuracy of the detection result caused by the detection error of different radar sensors can be reduced effectively, thus improving accuracy of the detection of the living finger.

For example, the matching threshold may be set according to a detection accuracy requirement for actually detecting a living finger. For example, the matching threshold may be set to 0.65 or 0.75, or the like, which is not limited in the example of the present disclosure.

In some examples, the method may further include:

acquiring a normal-characteristic sample in a normal finger identification scene with the radar sensor;

acquiring an abnormal-characteristic sample in an abnormal finger identification scene with the radar sensor; and inputting the normal-characteristic sample and the abnormal-characteristic sample into a classification training model, and performing training to acquire the living finger identification model. A matching result obtained by matching the normal-characteristic sample with the living finger identification model is larger than a matching result obtained by matching the abnormal-characteristic sample with the living finger identification model.

In the example of the present disclosure, the finger identification model may be a model acquired by training characteristic samples in a finger identification scene and a classification training model.

The normal-characteristic samples may be samples acquired with a radar sensor in a scene of the living fingerprint unlocking. The abnormal-characteristic samples may be samples other than the normal-characteristic samples. Here, the abnormal-characteristic samples may be samples acquired with the radar sensor in a plurality of abnormal scenes. The abnormal scenes may include an identification scene of a non-fingerprint identification region, an identification scene of a prosthetic finger, an identification scene of a non-finger, or an identification scene of a plurality of fingers, which is not limited in the example of the present disclosure.

It is to be noted that the terminal device may have a fingerprint identification region, and the aforementioned non-fingerprint identification region may be a region other than the fingerprint identification region of the terminal device. For example, the non-fingerprint identification region may include a region in which a decorative member of a camera is disposed or a region in which a housing on the side of the terminal device is disposed.

The identification scene of the aforementioned non-fingerprint identification region may be a scene in which an object being detected acts on the non-fingerprint identification region to perform the fingerprint unlocking. When the object being detected acts on the non-fingerprint identification region, the fingerprint sensor may not acquire the fingerprint of the object being detected; thus, the fingerprint identification and unlocking may not be realized. Therefore, the identification scene of the non-fingerprint identification region may be used as an abnormal finger identification scene for fingerprint unlocking.

The identification scene of the prosthetic finger may be a scene in which the fingerprint unlocking is performed by the prosthetic finger in the fingerprint identification region. The prosthetic finger may be a finger made of plastic or silica gel.

The non-finger identification scene may be an identification scene in which a user takes a part other than a finger as the object being detected. The part other than the finger may include an elbow, a finger contact, or a stylus, which is not limited in the example of the present disclosure.

The identification scene of the plurality of fingers may be an identification scene in which the plurality of fingers simultaneously act on the fingerprint identification region. For example, cases that the plurality of fingers simultaneously act on the fingerprint identification region may include: two fingers simultaneously acting on the fingerprint identification region, or, three fingers simultaneously acting on the fingerprint identification region, which is not limited in the example of the present disclosure.

In the example of the present disclosure, each of the normal-characteristic sample and the abnormal-characteristic sample may include a plurality of samples, and the normal-characteristic sample and the abnormal-characteristic sample may be the samples extracted from different manually simulated scenes. Therefore, the normal-characteristic sample and the abnormal-characteristic sample can accurately represent the identification process in a real scene, and an accurate matching degree can be obtained based on the living finger identification model trained by the normal-characteristic sample and the abnormal-characteristic sample, so that the living fingerprint determined based on the matching degree can be more accurate.

For example, the classification training model may include a model formed by Convolutional Neural Network (CNN), which is not limited in the example of the present disclosure.

In some examples, the method may further include:

in response to a fingerprint template being input to the terminal device, acquiring a radar template characteristic with the radar sensor; and inputting the radar template characteristic into the living finger identification model to acquire an updated living finger identification model.

In the example of the present disclosure, when the fingerprint template is input to the terminal device, the fingerprint sensor may acquire the fingerprint of the object being detected and store the detected historical fingerprint as the fingerprint template in the terminal device. After determining that the object being detected is a living finger, the terminal device may match the current fingerprint acquired with the fingerprint sensor with the fingerprint template, thus enabling the identification for unlocking of the terminal device. The fingerprint template may be a complete fingerprint, and the terminal device can be unlocked with the fingerprint template.

The terminal device may store a living finger identification model in advance. When a template fingerprint is input to the terminal device, the living identification model may be updated based on a radar template characteristic acquired with the radar sensor.

It is to be noted that a scene in which a template fingerprint is input to the terminal device may belong to a normal finger identification scene. Therefore, the radar template characteristic may belong to the normal-characteristic sample, and the radar template characteristic may be input to the living finger identification model, so that the living finger identification model can be retrained to obtain a more accurate living finger identification model.

In some examples, the method may further include:

detecting whether the terminal device is in a state of being held;

refusing to unlock the terminal device, when the terminal device is not in the state of being held, or, the acquired fingerprint does not match the fingerprint template.

In the example of the present disclosure, it may be determined whether the terminal device is in the state of being held with a pressure sensor and a temperature sensor of the terminal device. For example, when the pressure detected with the pressure sensor is greater than a pressure threshold, and/or, the temperature detected with the temperature sensor is greater than the temperature threshold, it may be determined that the terminal device is in the state of being held.

It is to be noted that when the terminal device is not in the state of being held, it may indicate that an unlocking behavior is a non-user behavior or an unintended-touch behavior; and when the acquired fingerprint does not match the fingerprint template, it may indicate that the unlocking behavior is a not a user behavior authenticated by the terminal device. Therefore, by refusing to unlock the terminal device when the terminal device is not in the state of being held and/or the acquired fingerprint does not match the fingerprint template, the accuracy of unlocking of the terminal device can be improved.

In some examples, the method may further include:

acquiring the fingerprint with the fingerprint sensor while transmitting the radar wave; and discarding the fingerprint acquired with the fingerprint sensor, when no living finger is detected.

That is, according to the example of the present disclosure, when no living finger is detected, the fingerprint acquired with the fingerprint sensor may be discarded directly, instead of being further processed, so that the power consumption for processing the fingerprint can be reduced effectively, the power consumption of the terminal device can be saved, and the use time of the terminal device can be prolonged.

In the example of the present disclosure, when the radar sensor and the fingerprint sensor are simultaneously in an operation state, the terminal device may perform an unlocking operation when both an acquisition result obtained by the fingerprint sensor and a detection result of obtained by the radar sensor meet the requirement. Before confirming the detection result obtained by the radar sensor, the terminal device does not perform the unlocking operation even if the acquisition result obtained by the fingerprint sensor meets the requirement.

Figure 3:
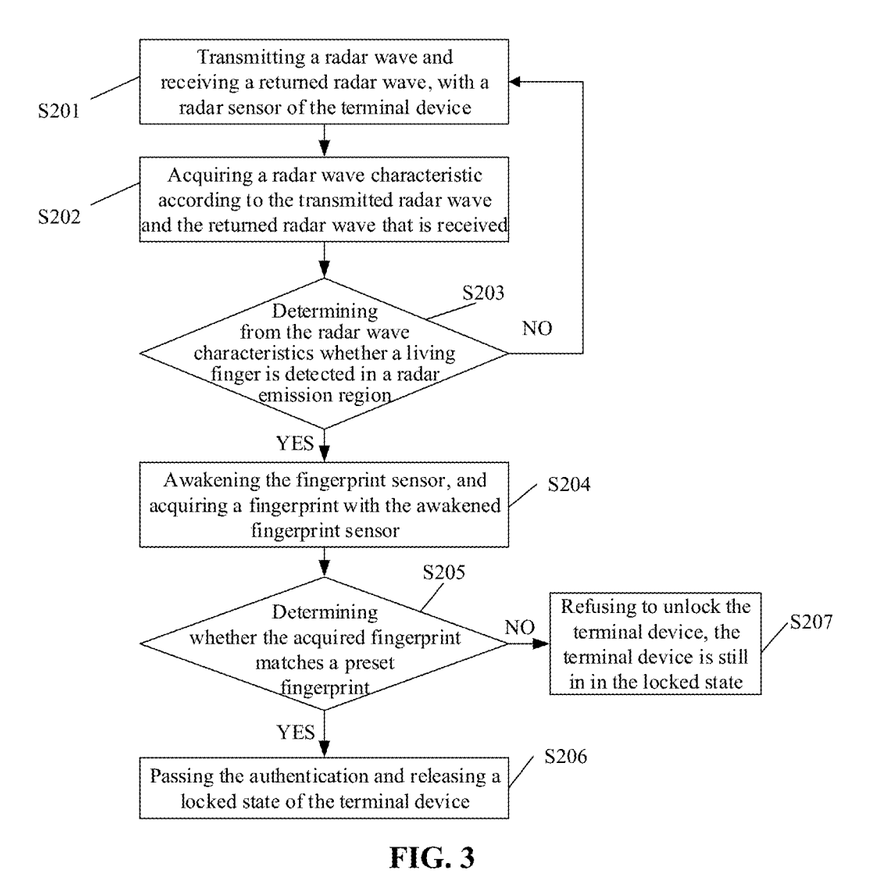
FIG. 3 is a flowchart showing yet another method for fingerprint identification, according to an example.

For a better understanding of the example of the present disclosure, as shown in FIG. 3, a method for fingerprint identification according to the example of the present disclosure is provided, the method including the following steps.

In step S201, a radar wave is transmitted and a returned radar wave is received, with a radar sensor of the terminal device.

In step S202, a radar wave characteristic is acquired, according to the transmitted radar wave and the returned radar wave that is received.

In step S203, it is determined from the radar wave characteristic whether a living finger is detected in a radar emission region. If determining that the living finger is detected, the method proceeds to step S204; and if determining that no living finger is detected, the method proceeds back to step S201.

In step S204, the fingerprint sensor is awakened, and a fingerprint is acquired with the awakened fingerprint sensor.

In step S205, it is determined whether the acquired fingerprint matches a preset fingerprint. If determining that the acquired fingerprint matches the preset fingerprint, the method proceeds to step S206; and if determining that the acquired fingerprint does not match the preset fingerprint, the method proceeds to step S207.

In step S206, the authentication is passed, and a locking state of the terminal device is released.

In step S207, unlocking is refused, and the terminal device is still in the locking state.

Figure 4:
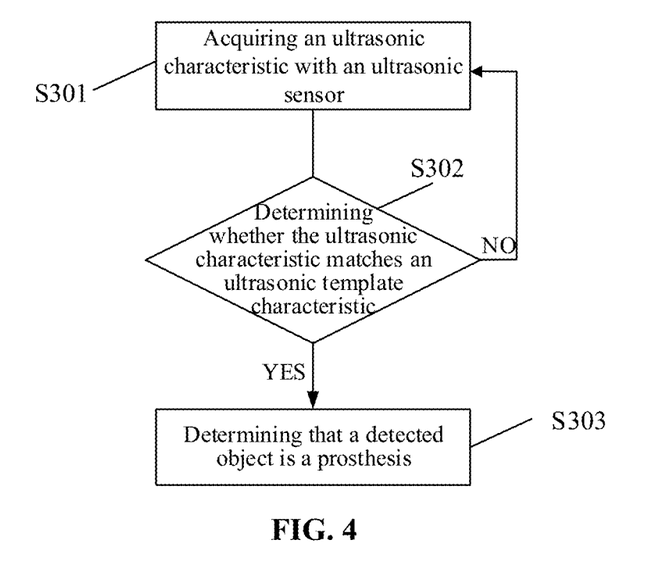
FIG. 4 is a flowchart showing a method for ultrasonic identification, according to an example.

It is to be noted that the prosthesis may also be identified with an ultrasonic sensor before fingerprint sensor is awakened. The ultrasonic sensor can determine the material of the object being detected from variations of the reflected ultrasonic waves of different objects being detected, thus realizing identification of the prosthesis. As shown in FIG. 4, the step of identifying the prosthesis may include the following steps. In step S301, an ultrasonic characteristic is acquired with the ultrasonic sensor. In step S302, it is determined whether the ultrasonic characteristic matches an ultrasonic template characteristic. If the ultrasonic characteristic matches the ultrasonic template characteristic, the method proceeds to step S303; and if the ultrasonic characteristic does not match the ultrasonic template characteristic, the method proceeds back to step S301. In step S303, the object being detected is determined as a prosthesis. It can be seen from the identification of the prosthesis through ultrasonic that the ultrasonic sensor can identify the prosthesis, but cannot identify whether the object being detected is a finger. Therefore, there is a problem of misoperation caused by unlocking due to a non-finger identification, and there is also a case in which the power consumption of the terminal device is increased by unlocking due to a non-finger identification.

Based on this, according to the example of the present disclosure, the radar wave characteristic may be acquired based on the returned radar wave received with the radar sensor, and it is determined whether a living finger is detected based on the radar wave characteristic. And then, the fingerprint sensor is awakened to acquire a fingerprint, in response to determining that the living finger is detected. That is, in the example of the present disclosure, before the fingerprint sensor acquires the fingerprint; it is firstly determined whether the living finger is detected in a radar emission region, rather than performing fingerprint acquisition on any object being detected. Therefore, by detecting the living finger, unlocking caused by unintended touch of a non-finger or a prosthesis is reduced effectively, and accuracy of the fingerprint unlocking is improved. In addition, since the fingerprint sensor is awakened when the living finger is detected, the system power consumption increasement due to awakening of the fingerprint acquisition module by unintended touch is reduced. Therefore, the power consumption of the terminal device can be effectively saved with the fingerprint unlocking function, and the use time of the terminal device can be prolonged.

Figure 5:
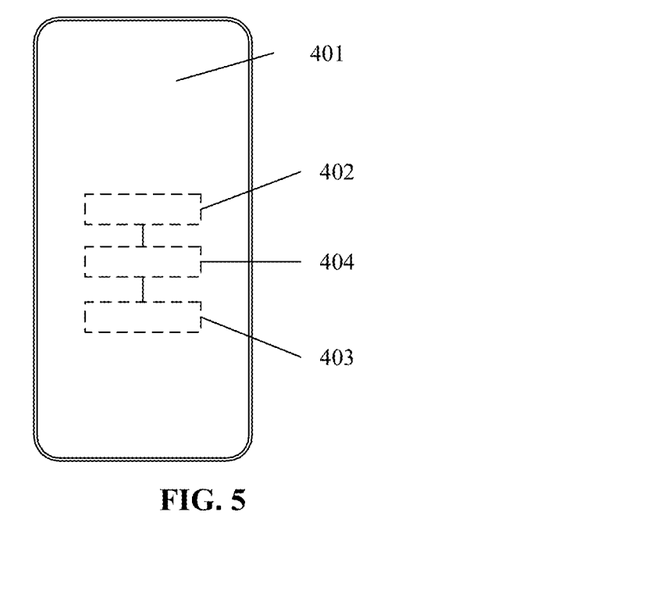
FIG. 5 is a schematic structural diagram illustrating a terminal device, according to an example.

In the examples of the present disclosure, a terminal device is further provided. As shown in FIG. 5, the terminal device includes:

a screen 401;

a fingerprint sensor 402, disposed below the screen and facing the screen;

a radar sensor 403, disposed below the screen and at a different position from that of the fingerprint sensor, and configured to transmit a radar wave to the screen and receive a returned radar wave; and a processor 404, connected to the radar sensor and the fingerprint sensor. The processor is configured to acquire a radar wave characteristic, according to the transmitted radar wave and the returned radar wave that is received; and in response to determining from the radar wave characteristic that a living finger is detected in a radar emission region of the radar sensor, control the fingerprint sensor to acquire a fingerprint, and identify the acquired fingerprint for unlocking of the terminal device.

The terminal device may be a wearable electronic device and a mobile terminal. The mobile terminal may include a mobile phone, a notebook, and a tablet computer; and the wearable electronic device may include a smart watch, which is not limited in the example of the present disclosure.

The screen may be a screen formed of a Liquid Crystal Display (LCD), or a screen formed of an Organic Electroluminesence Display (OLED), which is not limited in the example of the present disclosure.

In the example of the present disclosure, the terminal device may have a fingerprint identification region, which may be disposed on a screen, and an acquisition surface of the corresponding fingerprint sensor may face the screen; thus, fingerprint identification can be realized by acquiring an object being detected in the fingerprint identification region in the screen.

The fingerprint identification region may also be disposed on the back shell of the terminal device, and the acquisition surface of the corresponding fingerprint sensor may face toward the back shell; thus, the fingerprint identification can be realized based on the object being detected in the fingerprint identification area on the back shell.

In the example of the present disclosure, the orientation of the acquisition surface of the radar sensor may be the same as that of the acquisition surface of the fingerprint sensor. The radar sensor may include one or more radar sensors, which is not limited in the example of the present disclosure.

For example, the radar sensor may include, but is not limited to, a millimeter wave radar sensor. The millimeter wave radar sensor may emit a radar wave at an extremely high frequency of 60 GHz and a wavelength of 5 mm to improve detection accuracy.

It is to be noted that, the terminal device may firstly acquire the radar wave characteristic based on the returned radar wave received with the radar sensor, and determine whether a living finger is detected based on the radar wave characteristic. And then, the terminal device may awaken the fingerprint sensor to acquire a fingerprint, in response to determining that the living finger is detected. That is, in the example of the present disclosure, before the fingerprint sensor acquires the fingerprint; it is firstly determined whether the living finger is detected in a radar emission region, rather than performing fingerprint acquisition on any object being detected. Therefore, by detecting the living finger, unlocking caused by unintended touch of a non-finger or a prosthesis is reduced effectively, and accuracy of the fingerprint unlocking is improved. In addition, since the fingerprint sensor is awakened when the living finger is detected, the system power consumption increasement due to awakening of the fingerprint acquisition module by unintended touch is reduced. Therefore, the power consumption of the terminal device can be effectively saved with the fingerprint unlocking function, and the use time of the terminal device can be prolonged.

In some examples, the radar sensor may include:

at least one transmitter, configured to transmit the radar wave, and disposed adjacent to the fingerprint sensor; and at least one receiver, configured to receive the returned radar wave and disposed separate from the transmitter.

In the example of the present disclosure, the number of transmitters may be less than or equal to the number of receivers, which is not limited in the example of the present disclosure.

It is to be noted that the terminal device may be provided with a plurality of transmitters to acquire a plurality of sets of returned radar waves and a corresponding plurality of sets of radar wave characteristics, so that it can be determined more accurately whether the object being detected is a living finger based on the plurality of sets of radar wave characteristics. Moreover, according to the example of the present disclosure, a plurality of receivers can be provided to improve a reception rate of receiving the plurality of sets of returned radar waves. And further, it can be determined more accurately whether the object being detected is a living finger based on the radar wave characteristics corresponding to the plurality of sets of returned radar waves.

Figure 6:
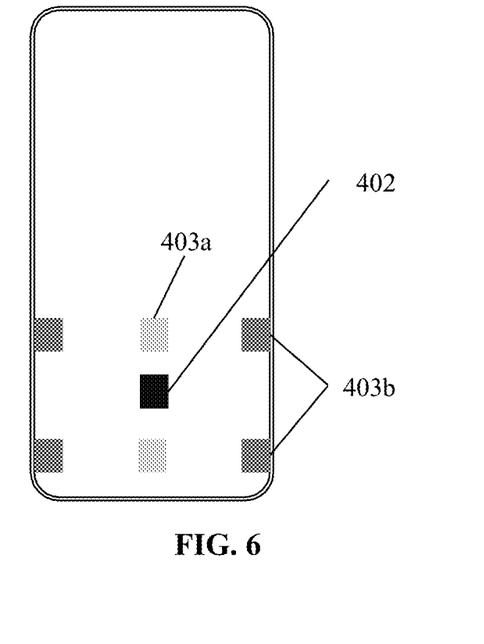
FIG. 6 is a schematic structural diagram illustrating a terminal device, according to an example.

In some examples, as shown in FIG. 6, the at least one transmitter may include two transmitters 403*a* disposed on opposite sides of the fingerprint sensor 402; and the at least one receiver 403*b* may include four receivers 403*b*, disposed around the fingerprint sensor 402 symmetrically with the fingerprint sensor 402 as a center.

In the example of the present disclosure, the transmitter may be disposed to be opposite to the fingerprint sensor, so that the transmitter can transmit radar waves to a the object being detected in different directions, and the corresponding radar wave characteristic can be acquired more comprehensively. Four receivers may be disposed around the fingerprint sensor symmetrically with the fingerprint sensor as a center, so that the returned radar wave from the object being detected can be received with the receivers, and the reception rate of the returned radar wave can be improved.

In some examples, as shown in FIG. 6, the at least one receiver 403*b* may be disposed at an edge of the terminal device.

In the example of the present disclosure, the receiver may be disposed at the edge of the terminal device, so that the receiver can better receive the returned radar wave.

With regard to the terminal device in the foregoing examples, the specific manner, in which the respective module of the terminal device performing operations, has been described in detail in the foregoing examples of the method, and no detailed explanation will be elaborated here.

Figure 7:
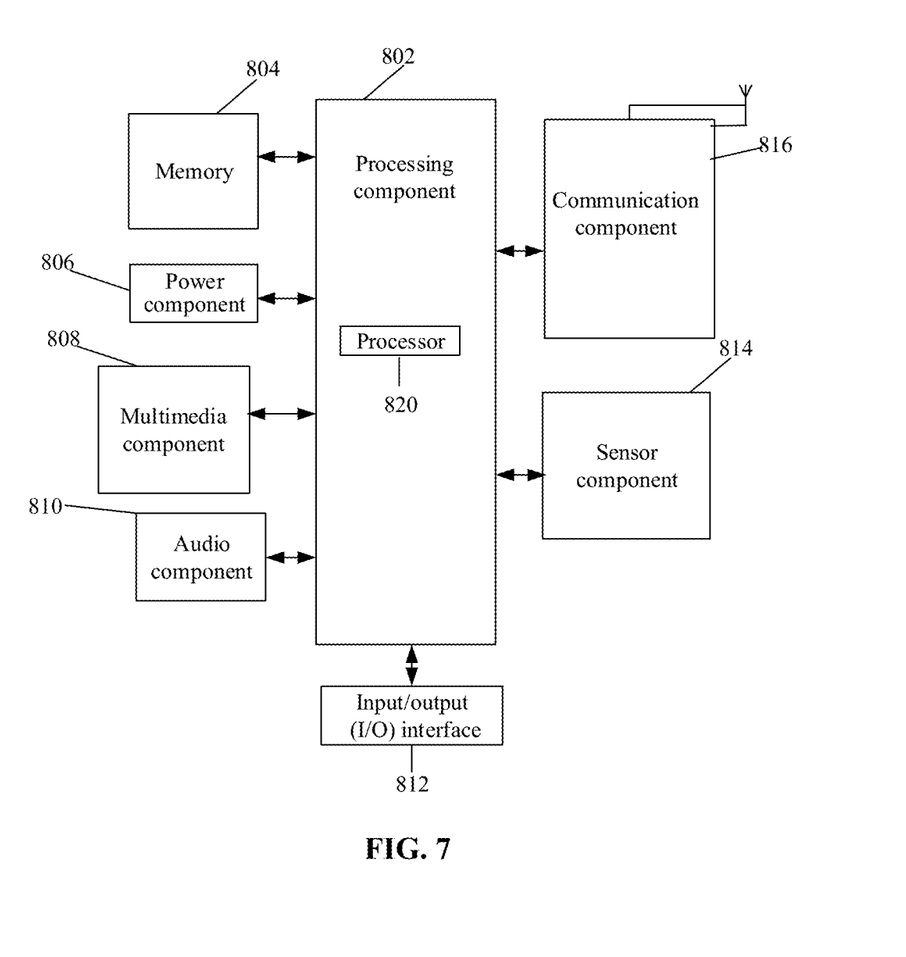
FIG. 7 is a structural block diagram illustrating a terminal device, according to an example.

FIG. 7 is a block diagram of a terminal device according to an example. For example, the terminal device may be a mobile phone, a mobile computer, or the like.

Referring to FIG. 7, the terminal device may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented using any type of volatile or non-volatile memory devices, or a combination of the volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device. The power component 806 may include a power management system, one or more power sources, and any other components associated with the generation, management, and distribution of power in the terminal device.

The multimedia component 808 includes a screen providing an output interface between the terminal device and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 808 includes a front camera and/or a rear camera. The front camera and the rear camera may receive an external multimedia datum while the terminal device is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device is in an operation mode, such as a call mode, a recording mode, and a voice identification mode. The received audio signal may be further stored in the memory 804 or transmitted via the communication component 816. In some examples, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device. For instance, the sensor component 814 may detect an on/off status of the terminal device, relative positioning of components, e.g., the display and the keypad, of the terminal device, a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the presence of nearby objects without any physical contact. The sensor component 814 may also include a light sensor, such as a CMOS or CCD image sensor, for use in imaging applications. In some examples, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device and other devices. The terminal device can access a wireless network based on a communication standard, such as Wi-Fi, 2G, or 3G, or a combination thereof. In one example, the communication component 816 receives a broadcast signal or broadcast associated information from an external broadcast management system via a broadcast channel. In one example, the communication component 816 further includes a near field communication (NFC) module to facilitate short-range communications. For example, the NFC module may be implemented based on a radio frequency identification (RFID) technology, an infra-red data association (IrDA) technology, an ultra-wideband (UWB) technology, a Bluetooth (BT) technology, and other technologies.

In examples, the terminal device may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer readable storage medium including instructions, such as the memory 804 including instructions, the instructions are executable by the processor 820 in the terminal device, to perform the above-described methods. For example, the non-transitory computer-readable storage medium may be a ROM, a CD-ROM, a magnetic tape, a floppy disc, an optical data storage device, and the like.

A non-temporary computer-readable storage medium having stored therein computer-executable instructions which, when executed by a processor, cause the processor to implement a method for fingerprint identification, and the method includes:

transmitting a radar wave and receiving a returned radar wave with a radar sensor of the terminal device, in response to performing a fingerprint unlocking of the terminal device;

acquiring a radar wave characteristic, according to the transmitted radar wave and the returned radar wave that is received;

in response to determining from the radar wave characteristic that the living finger is detected in the radar emission region of the radar sensor, awakening the fingerprint sensor of the terminal device; and acquiring the fingerprint based on the awakened fingerprint sensor, and identifying the acquired fingerprint for unlocking of the terminal device.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. This disclosure is intended to cover any variations, uses, or adaptations of the disclosure following the general principles thereof and including such departures from the present disclosure as come within known or customary practice in the art. It is intended that the specification and examples be considered as exemplary.

It will be appreciated that the present disclosure is not limited to the exact construction that has been described above and illustrated in the accompanying drawings, and that various modifications and changes can be made without departing from the scope thereof. It is intended that the scope of the disclosure be limited by the appended claims.

What is claimed is:

1. A method for fingerprint identification, applied to a terminal device, comprising:

transmitting a radar wave and receiving a returned radar wave by using a radar sensor of the terminal device;

acquiring a radar wave characteristic according to the transmitted radar wave and the received returned radar wave;

determining from the radar wave characteristic that a living finger is detected in a radar emission region of the radar sensor; and acquiring a fingerprint based on the fingerprint sensor of the terminal device, and identifying the acquired fingerprint for unlocking of the terminal device, wherein determining from the radar wave characteristic that the living finger is detected in the radar emission region of the radar sensor comprises:

acquiring a normal-characteristic sample in a normal finger identification scene with the radar sensor;

acquiring an abnormal-characteristic sample in an abnormal finger identification scene with the radar sensor; inputting the normal-characteristic sample and the abnormal-characteristic sample into a classification training model, and performing training to acquire a living finger identification model; wherein a matching result obtained by matching the normal-characteristic sample with the living finger identification model is larger than a matching result obtained by matching the abnormal-characteristic sample with the living finger identification model; inputting the radar wave characteristic into the living finger identification model to acquire a matching degree between an object being detected and the living finger identification model; in response to that the matching degree is greater than a matching threshold, determining that the living finger is detected in the radar emission region of the radar sensor; or determining, when an attitude change of the object being detected meets a preset condition, that the object being detected is the living finger, wherein the preset condition includes a preset movable angular range and the living finger has a movable angular range.

2. The method of claim 1, wherein acquiring the fingerprint based on the fingerprint sensor of the terminal device and identifying the acquired fingerprint for unlocking comprises:

awakening the fingerprint sensor of the terminal device; and acquiring the fingerprint based on the awakened fingerprint sensor, and identifying the acquired fingerprint for unlocking of the terminal device.

3. The method of claim 1, further comprising:
in response to a fingerprint template being entered to the terminal device, acquiring a radar template characteristic with the radar sensor; and
inputting the radar template characteristic into the living finger identification model to acquire an updated living finger identification model.

4. The method of claim 1, further comprising:
detecting whether the terminal device is in a state of being held; and refusing to unlock the terminal device, when the terminal device is not in the state of being held.

5. The method of claim 1, further comprising:
refusing to unlock the terminal device, when the acquired fingerprint does not match the fingerprint template.

6. The method of claim 1, wherein:
acquiring the radar wave characteristic according to the transmitted radar wave and the received returned radar wave, comprises:
performing time-frequency processing on the transmitted radar wave and the returned radar wave to acquire the radar wave characteristic; and
the radar wave characteristic comprises:
a shape characteristic of an object being detected in the radar emission region determined based on the returned radar wave; and
an attitude change characteristic within a preset time period.

7. The method of claim 6, further comprising:
determining whether the object being detected is of a finger shape, according to the shape characteristic; and
determining whether the object being detected is a living body, according to the attitude change characteristic.

8. The method of claim 1, further comprising:
controlling the fingerprint sensor to be in a sleep state, when no living finger is detected.

9. The method of claim 1, further comprising:
acquiring the fingerprint with the fingerprint sensor while transmitting the radar wave; and
discarding the fingerprint acquired with the fingerprint sensor, when no living finger is detected.

10. A terminal device, comprising:
a screen;
a fingerprint sensor, disposed below the screen and facing the screen;
a radar sensor, disposed below the screen and at a different position from that of the fingerprint sensor, and configured to transmit a radar wave to the screen and receive a returned radar wave; and
a processor, connected to the radar sensor and the fingerprint sensor, wherein the processor is configured to:
acquire a radar wave characteristic according to the transmitted radar wave and the received returned radar wave;
determine from the radar wave characteristic that a living finger is detected in a radar emission region of the radar sensor; and
acquire a fingerprint based on the fingerprint sensor of the terminal device, and identify the acquired fingerprint for unlocking of the terminal device,
wherein the processor is further configured to:
acquire a normal-characteristic sample in a normal finger identification scene with the radar sensor; acquire an abnormal-characteristic sample in an abnormal finger identification scene with the radar sensor; input the normal-characteristic sample and the abnormal-characteristic sample into a classification training model, and performing training to acquire a living finger identification model; wherein a matching result obtained by matching the normal-characteristic sample with the living finger identification model is larger than a matching result obtained by matching the abnormal-characteristic sample with the living finger identification model; input the radar wave characteristic into the living finger identification model to acquire a matching degree between an object being detected and the living finger identification model; in response to that the matching degree is greater than a matching threshold, determine that the living finger is detected in the radar emission region of the radar sensor; or
determine, when an attitude change of the object being detected meets a preset condition, that the object being detected is the living finger, wherein the preset condition includes a preset movable angular range and the living finger has a movable angular range.

11. The terminal device of claim 10, wherein the radar sensor comprises:
at least one transmitter, configured to transmit the radar wave, and disposed adjacent to the fingerprint sensor; and
at least one receiver, configured to receive the returned radar wave, and disposed separate from the transmitter.

12. The terminal device of claim 11, wherein the at least one transmitter comprises two transmitters disposed on opposite sides of the fingerprint sensor; and
the at least one receiver comprises four receivers, disposed around the fingerprint sensor symmetrically with the fingerprint sensor as a center.

13. The terminal device of claim 11, wherein the at least one receiver is disposed at an edge of the terminal device.

14. The terminal device of claim 11, wherein the processor is further configured to:
  awaken the fingerprint sensor of the terminal device; and
  acquire the fingerprint based on the awakened fingerprint sensor, and identify the acquired fingerprint for unlocking of the terminal device.

15. The terminal device of claim 10, wherein the processor is further configured to:
  in response to a fingerprint template being entered to the terminal device, acquire a radar template characteristic with the radar sensor; and
  input the radar template characteristic into the living finger identification model to acquire an updated living finger identification model.

16. A non-transitory computer-readable storage medium having stored therein computer-executable instructions which, when executed by a processor, cause the processor to:
  transmit a radar wave and receive a returned radar wave by using a radar sensor of the terminal device;
  acquire a radar wave characteristic, according to the transmitted radar wave and the received returned radar wave;
  determine from the radar wave characteristic that a living finger is detected in a radar emission region of the radar sensor; and
  acquire a fingerprint based on the fingerprint sensor of the terminal device, and identify the acquired fingerprint for unlocking of the terminal device,
  wherein when executed by the processor, the computer-executable instructions further cause the processor to:
    acquire a normal-characteristic sample in a normal finger identification scene with the radar sensor; acquire an abnormal-characteristic sample in an abnormal finger identification scene with the radar sensor; input the normal-characteristic sample and the abnormal-characteristic sample into a classification training model, and performing training to acquire a living finger identification model; wherein a matching result obtained by matching the normal-characteristic sample with the living finger identification model is larger than a matching result obtained by matching the abnormal-characteristic sample with the living finger identification model; input the radar wave characteristic into the living finger identification model to acquire a matching degree between an object being detected and the living finger identification model; in response to that the matching degree is greater than a matching threshold, determine that the living finger is detected in the radar emission region of the radar sensor; or
    determine, when an attitude change of the object being detected meets a preset condition, that the object being detected is the living finger, wherein the preset condition includes a preset movable angular range and the living finger has a movable angular range.

* * * * *